April 18, 1950 J. A. ROHRER 2,504,589

PROGRAM-SCHEDULING APPARATUS

Filed April 30, 1945 6 Sheets-Sheet 1

Inventor
John A. Rohrer by [signature] Attys

April 18, 1950 J. A. ROHRER 2,504,589

PROGRAM-SCHEDULING APPARATUS

Filed April 30, 1945 6 Sheets-Sheet 2

Inventor
John A. Rohrer by The [illegible] Attys

PROGRAM-SCHEDULING APPARATUS

Filed April 30, 1945 6 Sheets-Sheet 3

Inventor
John A. Rohrer
by The Firm of Charles W. Hills Attys

PROGRAM-SCHEDULING APPARATUS

Filed April 30, 1945 6 Sheets-Sheet 4

Inventor
John A. Rohrer by The Firm of Charles W. Hills Attys

PROGRAM-SCHEDULING APPARATUS

Inventor
John A. Rohrer by [signature] Attys

April 18, 1950 J. A. ROHRER 2,504,589
PROGRAM-SCHEDULING APPARATUS
Filed April 30, 1945 6 Sheets-Sheet 6

Inventor
John A. Rohrer
by The Firm of Charles W. Hills Attys

Patented Apr. 18, 1950 2,504,589

UNITED STATES PATENT OFFICE 2,504,589

PROGRAM-SCHEDULING APPARATUS

John A. Rohrer, La Grange, Ill., assignor to Harold F. Elliott, Palo Alto, Calif.

Application April 30, 1945, Serial No. 591,097

18 Claims. (Cl. 250—20)

The present invention relates to program-scheduling apparatus for a radio receiver or similar apparatus. While, for purposes of illustration of the present invention, the apparatus is shown for the purpose of automatically tuning a radio receiver so as to play preselected stations over a 24-hour period, it will be apparent to those skilled in the art that the invention has other similar applications, such as that of preselection of records to be played by an automatic record changing and reproducing device and the like.

In the use of a radio receiver over a day's period, one naturally finds it desirable to tune in only his favorite programs. Radio programs, however, are generally changed every 15 minutes or half hour, and in some cases, every hour, hence, it is necessary for the radio fan to continually operate the controls and tune his radio receiver from time to time to obtain the sequence of favorite radio programs he desires. Radio programs are published daily in newspapers, hence, one may select a series of programs for a day's period or a 24-hour period.

The necessity for referring to a schedule of radio programs every 15 minutes or half hour and tuning the receiver to the station desired is an inconvenience either to the housewife listening in on her favorite programs throughout the day while doing housework, or for business establishments, such as restaurants, that desire to select a predetermined sequence of radio programs for the enjoyment of the patrons throughout the course of the day and night. Often, even with careful attention, time passes by so rapidly that favorite programs are missed.

Heretofore there have been devised numerous so-called "clock controlled" tuners for radio-broadcast receivers. These have generally provided for determining the tuning of the receiver at 15-minute intervals over a 24-hour period. In certain of such prior art devices, there have been provided separate settable control elements, either mechanical or electrical, for each of the periods and each of the functions or stations to be controlled. Since there are ninety-six 15-minute intervals in a day, if six different functional controls are desired, that is, if it is desired to be able to control the tuning to six different broadcasting stations, the apparatus has required a number of control elements equal to the product of these two numbers, that is 576. Such an arrangement is inherently complicated and difficult to encompass in an apparatus of reasonable size and it is also difficult to construct in a form which is convenient to set up from the front of the apparatus.

There has also heretofore been proposed a program-scheduling apparatus in which there is provided a single settable control element having at least two freedoms of motion so as to be able to interconnect any desired timing elements and any desired function-determining elements. While such an apparatus is very flexible and simple in construction, when applied to certain installations it requires a quite careful and critical adjustment on the part of the operator, which it is desirable to avoid.

It is an object of the invention, therefore, to provide a new and improved program-scheduling apparatus which is effective to obviate one or more of the above-mentioned disadvantages and limitations of such apparatus of the prior art.

It is another object of the invention to provide a new and improved program-scheduling apparatus which is effective to avoid the large number of settable control elements required in certain of the prior art apparatus, while at the same time facilitating the quick and accurate setting up of any desired time-function schedule.

In accordance with the invention, a program apparatus for setting up a predetermined schedule of a plurality of functions within a given time period comprises a group of settable members, means for movably supporting such members, and a group of member-setting devices. One of such groups corresponds in number to the number of time intervals in the total time period and the other group corresponds in number to the number of functions being controlled. The apparatus also includes means for supporting the member-setting devices for movement to set a member in registry therewith, the two supporting means being relatively movable to bring each device into registry with any of such members to set the same. Each of the member-setting devices has a different characteristic movement for moving a registering member a different amount and the apparatus includes further means responsive to the position of said members for determining the desired function-time intervals.

For a better understanding of the invention, together with other and further objects thereof, reference is had to the following description taken in connection with the accompanying drawings, while its scope will be pointed out in the appended claims.

Figure 4 is a longitudinal cross-sectional view of the structure shown in Figure 3;

Figure 5 is a top view of the structure shown in

Figure 3:
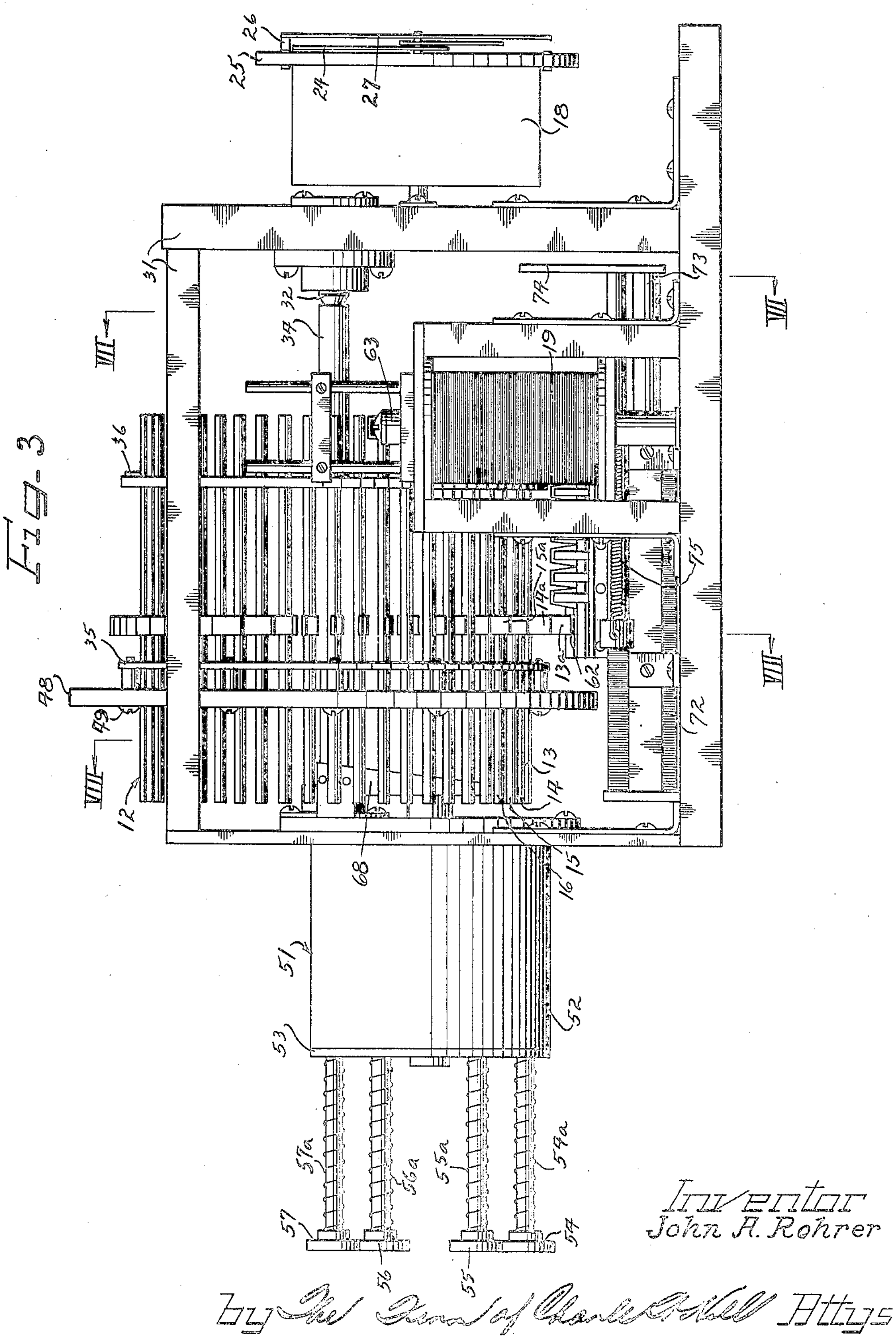
Figure 3 is a side view of the program-scheduling apparatus embodying the principles of the present invention.
Figure 7:
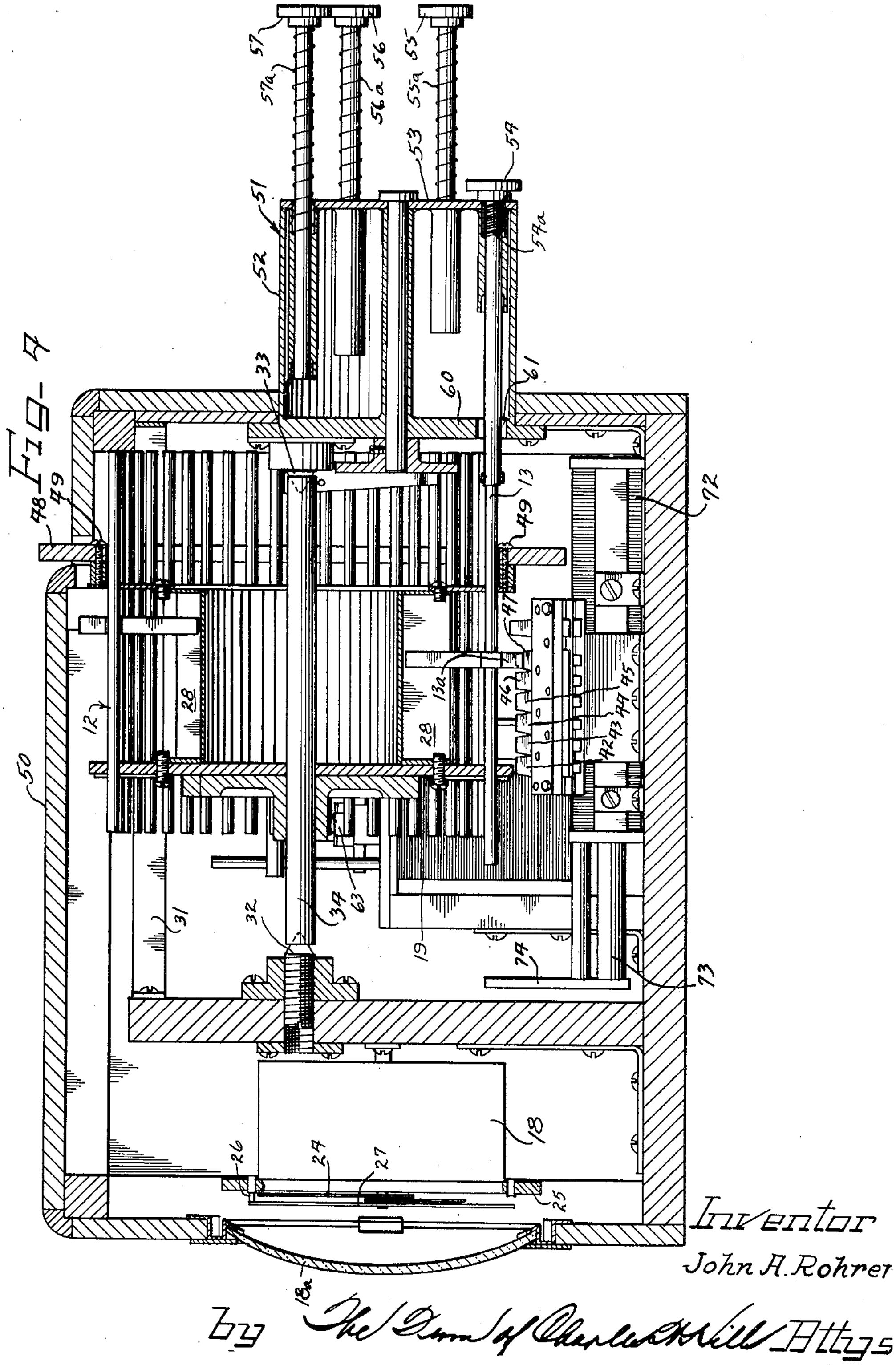
Figure 5:
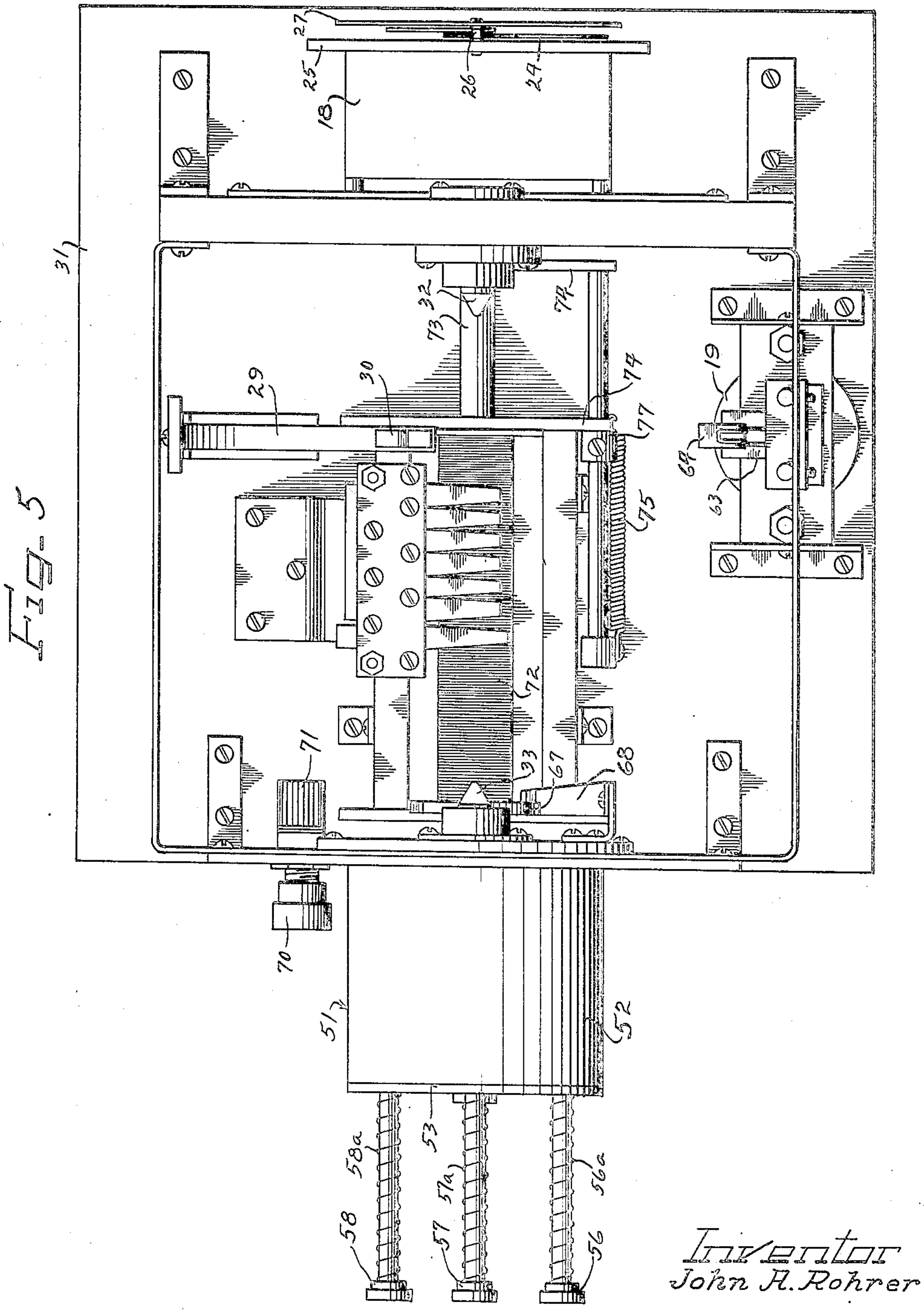
Figure 6:
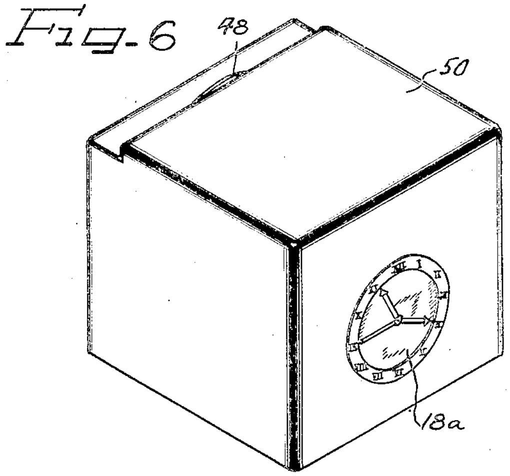
Figure 7:
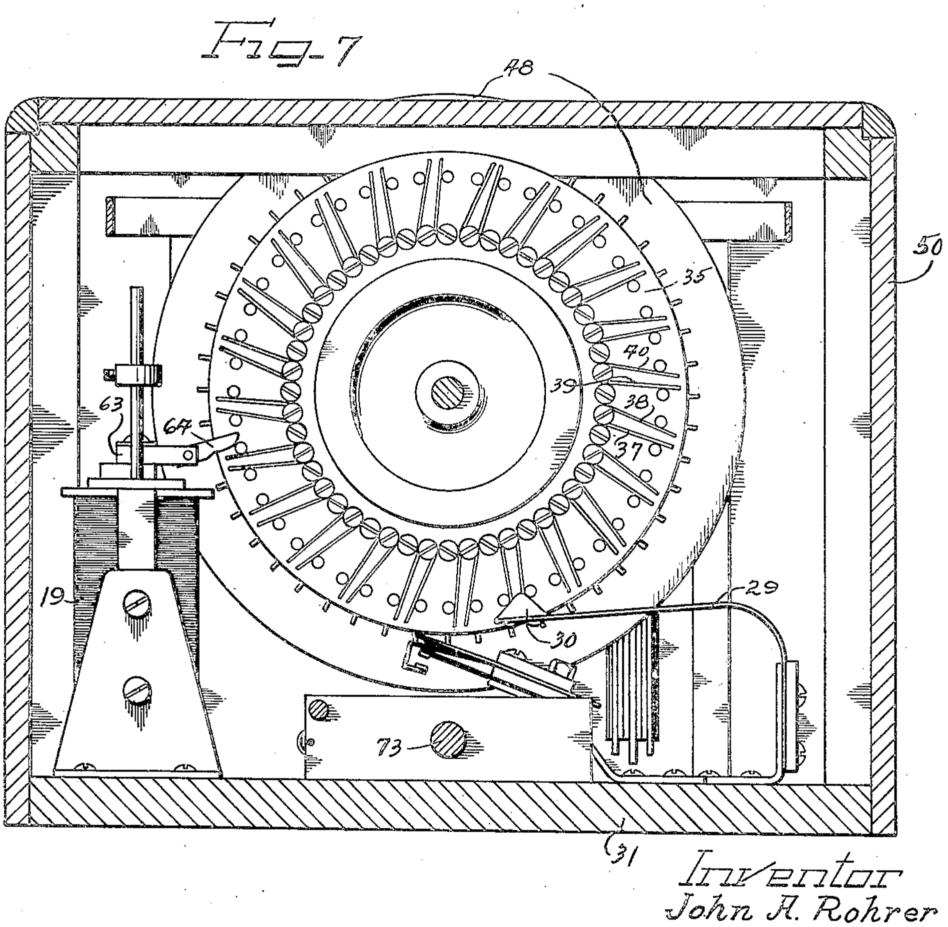
Figure 8:
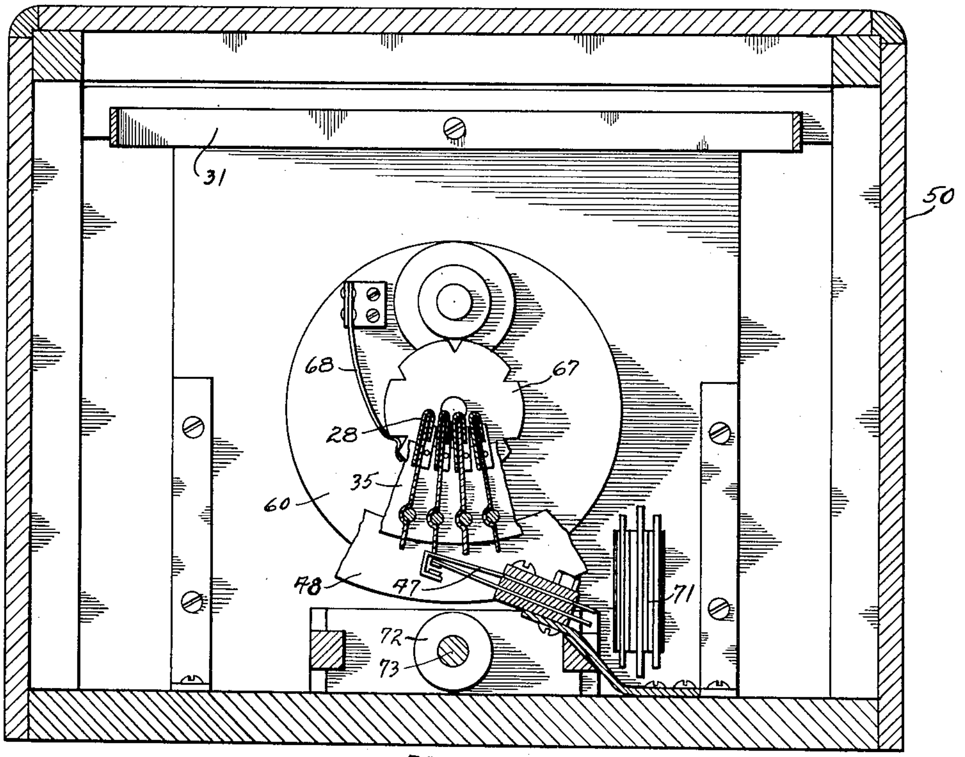

Figure 3 but with the cover and squirrel cage operating or tuning device removed;

Figure 6 is a perspective view of a cabinet or casing completely covering the apparatus illustrated in Figures 3, 4 and 5;

Figure 7 is a cross-sectional view taken along line 7—7 of Figure 3;

Figure 8 is a cross-sectional view taken along line 8—8 of Figure 3; and

Figure 9:
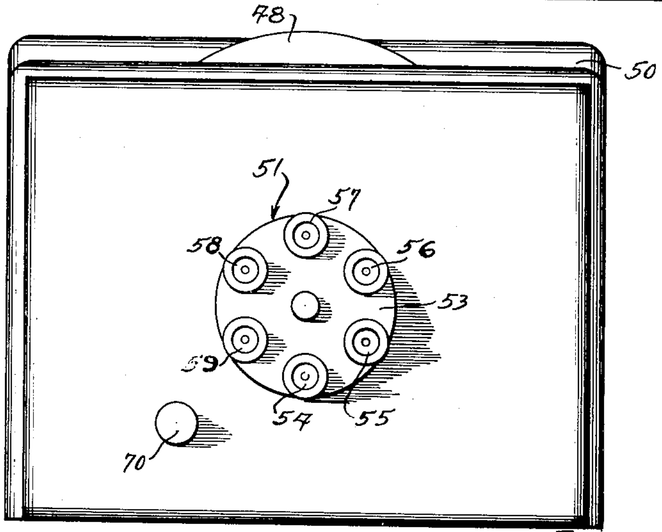

Figure 9 is a front view of the enclosed apparatus as viewed from the rear of the structure illustrated in Figure 6.

Figures 1, 2:
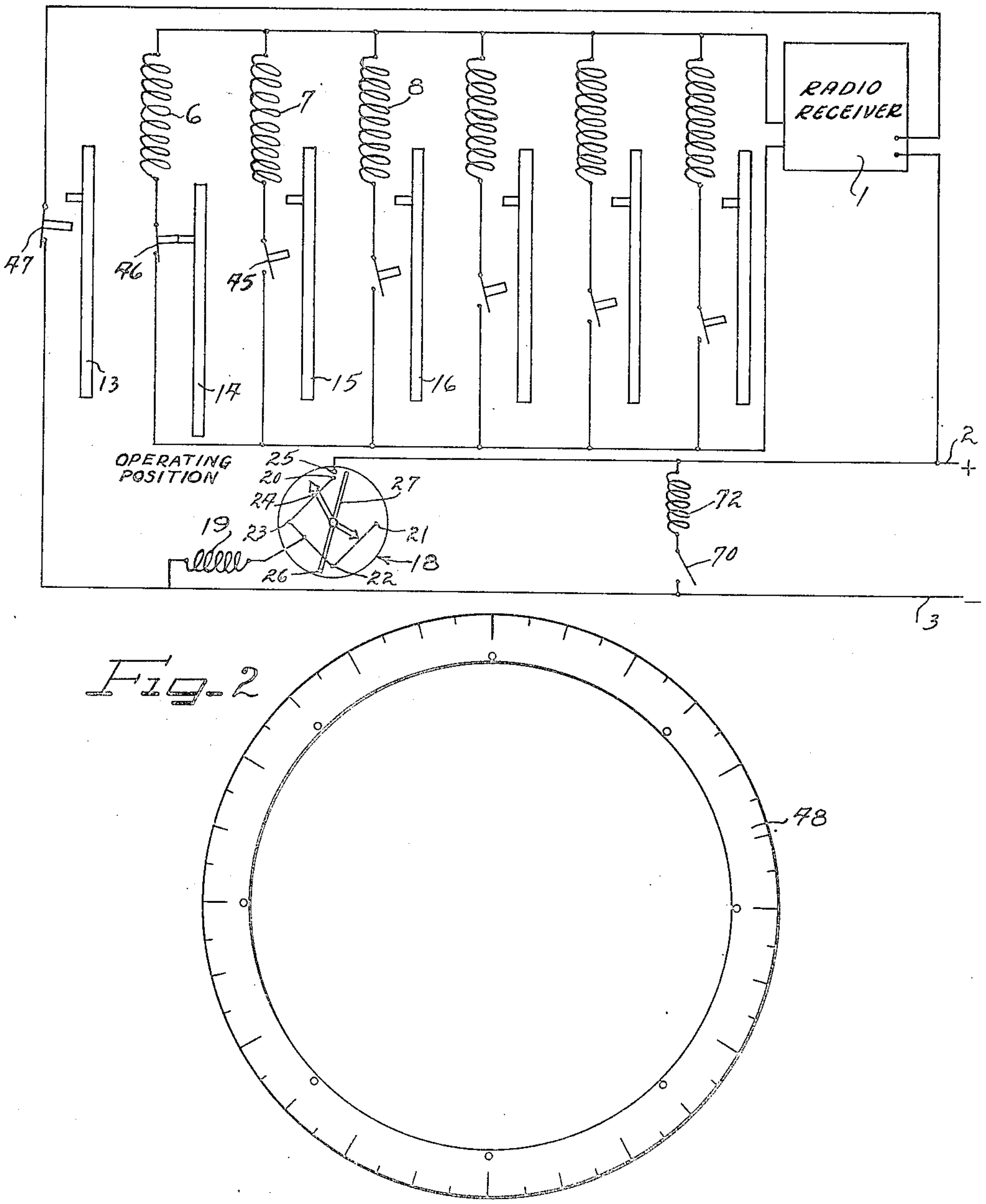
Figure 1 is a circuit diagram schematically illustrating a complete program-scheduling apparatus involving the teachings of the present invention.
Figure 2 is a front view of a dial which is selectively rotated for the purpose of preselecting time periods, in advance, at which tuning of the radio receiver is to be effected.

Referring more particularly to Figure 1, there is represented a schematic diagram of a program apparatus for setting up a predetermined schedule of a plurality of functions within a given time period; specifically, for setting up a radio receiver 1 to receive any of a plurality of frequencies or broadcast stations. The receiver may be of any well-known type energized by line terminals 2 and 3 connected to a source of electric energy, such as a D. C. or A. C. source, which, for convenience, is illustrated by the symbols plus (+) and minus (—). A switch 47, normally resiliently biased to the closed position by a spring finger, is provided in series with line terminal 3 which is connected in series with one of the input terminals of radio receiver 1. A plurality of selectable frequency-determining elements, such as tuning coils 6, 7, 8, etc., having different values of inductance, are, for purposes of clarity, shown external of the radio receiver 1—it being understood, however, that such coils may be bodily contained within the cabinet of the radio receiver for selective inclusion in the tuning circuit. A suitable operating device 12 (Fig. 3) is provided for the purpose of selectively connecting any one of the tuning coils 6, 7, 8, etc., in circuit relationship with the remainder of the radio receiver circuit (not shown) so as to tune the receiver to a particular frequency to obtain a particular radio station as well-known in the radio art. While, for purposes of illustration, tuning coils 6, 7, 8, etc., are illustrated as the frequency-determining elements to be selected for tuning purposes, it will be understood that effective tuning may also be accomplished by substituting condensers of different capacity for the tuning coils 6, 7, 8, etc., so as to tune to a particular frequency by varying the capacity instead of the inductance of the tuning circuit to obtain resonance to a predetermined frequency as well-known in the radio art. Tuning coils 6, 7, 8, etc., have, in series relationship therewith, switches 46, 45, etc., respectively, which switches are all normally biased to the open position by means of leaf spring fingers or other suitable means.

A rotatable frame 12 (see also Figure 3), to be described more fully hereinafter, includes a group of settable members, specifically elongated timing sliders 13, 14, 15, 16, etc., corresponding in number to the number of time intervals in said period and illustrated schematically in Figure 1, which sliders are sequentially moved into operative position by step-by-step rotation of device 12 and which may be adjustably positioned in a longitudinal direction so as to either come into confronting and engaging relationship with any of the switches 45, 46, etc., for example, switch 46 if the corresponding tuning coil 6 is previously selected to be inserted in the radio circuit, or may be disposed out of such confronting relationship so as to allow the corresponding tuning coil to be excluded from the radio circuit if radio silence is desired. As illustrated, only slider 14 is longitudinally adjusted to a position so as to effect closing of switch 46 when moved into the operative position to insert tuning coil 6 in the radio receiving circuit, whereas the other bars 15, 16, etc., are shown in the normal or "off" position so as to exclude all tuning coils from the radio receiving circuit despite their sequential movement to the operative or switch engaging position. As the frame 12 is partially rotated, different switches are successively moved into operating position as will appear more clearly hereinafter.

The program-scheduling apparatus also includes means for periodically advancing the frame 12 and its group of settable sliders 13, 14, 15, etc., step-by-step. This advancing means includes a timer such as an electric clock 18, also energized by line terminals 2 and 3, is shown schematically as having an electromagnet coil 19 in series therewith which coil has one end thereof connected to a plurality of contact members 20, 21, 22 and 23 disposed 90° apart on a clock face and adapted to be contacted by a contact member disposed at the end of the minute hand 24. There is also provided a contact member 25, preferably disposed at the 12 o'clock position of the clock, and adapted to be engaged by contact finger 26 disposed at one end of a sweep second hand 27 (see also Figure 3). In this manner, at 15 minute intervals, an energizing circuit will be momentarily completed through electromagnet coil 19 because at 15 minute intervals the contact member at the end of minute hand 24 will come into engagement with one of the contact members 20, 21, 22 or 23, and at the precise moment, that is, when reaching the 12 o'clock position, the contact member 26 on the sweep second hand 27 will momentarily engage contact 25 so as to complete the circuit through relay coil 19. Each time the coil 19 is energized, it will effect partial rotation of the frame 12 through $^1/_{48}$ of a revolution so as to effect sequential tuning to different preselected stations as will appear more clearly hereinafter.

Referring more particularly to Figures 3, 4 and 5 showing the actual mechanical structure of the program-scheduling apparatus embodying features of the present invention, numeral 31 denotes a supporting framework which has mounted thereon a pair of needle bearings 32 and 33 for rotatably mounting a shaft or arbor 34 which shaft forms a portion of the frame 12.

The rotatable frame 12 comprises means for movably supporting the members or sliders 13, 14, 15, etc., and includes opposed end plates or discs 35 and 36 rigidly secured to shaft 34, and having circular slots disposed adjacent the peripheries thereof in which are supported the sliders 13, 14, 15, etc., for longitudinal movement thereof, the sliders being disposed substantially in a cylindrical array. A plurality of hairpin-like springs, such as 37, 38, 39, 40, etc., are mounted by screws on one of the discs as shown in Figure 7 so that the ends of such springs frictionally engage a corresponding slider in order to hold the slider securely in any longitudinal position to which it may be adjustably slid. The springs, therefore, act somewhat like friction brakes for maintaining the sliders in any longitudinal position to which they may be adjusted without the danger of moving out of such position as the result of vibration, shock, or perhaps as the result of partial rotation of the frame 12. Each of the sliders 13, 14, 15, etc., has a radially extending switch operating cam or nib portion 13a, 14a, 15a, etc., welded or otherwise secured substantially centrally of the slider which is adapted to come into engagement with one of a plurality of fixed, normally open switches 42, 43, 44, 45, 46 and 47 disposed adjacent the periphery of the frame 12 to effect closing thereof. The other ends of the nibs are guided by the shaped channels 28 rigidly supported between discs 35 and 36 (see Figure 8). It will be seen, therefore, that depending upon the longitudinal position to which the respective switch operating sliders have been previously adjusted, the plurality of switches 42 to 47, inclusive, may be selectively operated as the result of contacting engagement by the switch operating cam or nib portion of the respective slider, and in this manner the corresponding tuning coils 6, 7, 8, etc., as shown in Figure 1, may be sequentially inserted in the radio receiver circuit so as to select any particular series of programs depending upon the inductances of the particular coils so inserted.

In order to preselect a series of radio programs to be automatically played over a 24-hour period, the calibrated preselector dial 48, preferably of insulation material, which is rigidly secured by bolts 49 to the frame 12, is partially rotated manually, that is, rotated through a fraction of a revolution, step-by-step, and is adjusted at intervals, depending upon how many time divisions are desired. For example, if it is desired to cause retuning every half hour over a 24-hour period, 48 sliders will be used, and the frame will be rotated through 1/48 of a revolution in order to go from one tuning adjustment to another. Of course, the greater the number of times that retuning is desired through a 24-hour period, the larger the number of sliders that will be used. A spring 29 (see Figure 7) has one end fixed to the framework 31 and has a cam 30 at the other end to engage and hold the sliders of device 12 in fixed positions. The peripheral side surface or edge of preselector dial 48 is suitably calibrated to correspond to the number of tuning time intervals employed. A portion of the calibrated dial 48 protrudes above the surface of the outer casing or cabinet 50 as will appear more clearly in Figures 4 and 9 so as to be readily accessible for manipulation for preselection of radio stations. Clock 18 is visible through crystal 18a as shown in Figure 6.

The switch operating sliders 13, 14, 15, etc., are initially longitudinally slid or pushed into definite positions by means of the station selecting device illustrated generally by numeral 51. The station selecting device comprises a hollow cylinder 52 rigidly secured to the supporting framework 31, in which are disposed a group of member setting devices, specifically a group of manually operable slider-setting devices such as the reciprocable push-buttons 54–59, inclusive, each including an end portion disposed to engage a slider in registry therewith. The push-buttons 54–59, inclusive, correspond in number to the number of functions to be controlled by the apparatus, that is, to the number of frequencies or broadcast stations to be selected.

The selecting device 51 also includes means for establishing an operative connection between each of said devices and any of the members or sliders to set the same. Specifically, this means comprises a frame or disc 53 rotatably mounted within cylinder 52 and eccentric with respect to the frame 12. The push-buttons 54–59, inclusive, are supported by and extend through the disc 53 for longitudinal movement to set a slider in registry therewith. The selecting device 51 also includes means, such as helical springs 54a–59a, inclusive (see Fig. 9), surrounding the outer portions of the push-buttons, for normally biasing their respective slider-setting devices or push-buttons out of engagement with the sliders. Push-buttons 54 to 59, inclusive, are of different lengths as will be noted from an inspection of Figure 4, but protrude from disc 53 by the same amount. Each of the slider-setting devices or push-buttons has a different characteristic movement; that is, it is movable a different distance for moving an operatively connected slider a different amount so as to effect closing of the appropriate switch of the switch group 42 to 47, inclusive, when subsequently rotated on device 12, in order to obtain tuning to the radio stations desired. Each of the push-buttons 54–59, inclusive, includes a head portion which acts as stop means for limiting the movements thereof to different amounts as described. In other words, each of the push-buttons corresponds to a different radio station and may be marked or labeled by the station call letters. Six push-buttons are illustrated as being exemplary of the number of popular local stations that may be normally found in a large city but, of course, any number of push-buttons or stations may be provided as desired. A disc 60 closes the other end of the hollow cylinder 52 and is rigidly secured to the casing 50. Disc 60 has a single opening 61 through which one of the push-buttons 54 to 59, inclusive, may be pushed when moved into position, as illustrated by the lower push-button in Figure 4. The lower slider in Figure 4 is thus moved to an extent so that its cam portion closes switch 47.

Preselection of a series of radio stations to be tuned is accomplished by partially rotating tuning dial 48 and frame 12 in a step-by-step manner and simultaneously rotating frame or disc 53, such rotation of the frames being effective to bring each of said member-setting devices or push-buttons into registry with any of said sliders. After each step-by-step movement of dial 48 and frame 12, the disc 53 is rotated into such position that the push-button corresponding to the particular radio station desired is in registry with hole 61. In order to facilitate detection and obtaining of such registry, a wheel 67 rigidly secured to cylinder 52 is provided with a number of peripherally disposed notches corresponding to the number of push-buttons used, that is, six, as illustrated, which are engageable by a cam-shaped end portion of stationary leaf spring 68 secured on disc 60 as will be seen most clearly in Figure 8. By such arrangement, when the push buttons are grasped and turned to cause turning of disc 53, the exact position for stopping the rotating movement will be detected by the slipping in or clicking of the cam-shaped portion of spring 68 into one of the notches in wheel 67 which may be felt by the operator which reveals to him that the lowermost push-button, as illustrated in Figure 4, is in exact registry with hole 61. Such push-button is then pushed in so that the end thereof abuts the end of the corresponding switch operating slider to move it longitudinally by the right amount so as to cause the cam portion on the slider to align with the appropriate switch which it is to subsequently operate. In this manner, by rotating dial 48 through a portion of a revolution and then rotating disc 53 so as to select the appropriate push-button for moving the lowermost slider, all of the sliders on the frame 12 may be longitudinally adjusted to the appropriate positions so as to preselect the proper tuning coils to obtain desired radio stations over a 24-hour period. In case that for a given time period no program is desired, the sliders are left in the position shown in Figure 3 whereby their integral cams come into engagement with a switch 62 to effect opening of the circuit and excluding all of the tuning coils from the radio circuit. Of course, the same station may be successively selected by longitudinally positioning successive switch operating sliders by the same amount, that is, by the same pushbutton. Any sequence of radio stations or silence periods may be thus preselected by appropriately rotating tuning dial 48 as well as the station selecting device 51 as described above.

Each time after the program-scheduling apparatus has been set up as described, the tuning dial 48 is then rotated manually so that it corresponds in position with the then reading of clock 18 to resynchronize the apparatus for further automatic selection of programs.

After all of the sliders are adjusted longitudinally to the desired positions so as to select the proper sequence of radio programs, the device will automatically operate as follows so as to tune in the various preselected radio stations at appropriate time periods. Electric clock 18 runs, and as described in connection with Figure 1, every 15 minutes a circuit is completed through electromagnet coil 19. When such coil 19 is energized, it will cause upward movement of the electromagnet armature and of the push rod 63 rigidly secured to the armature. A cam-shaped lever 64 is pivotally secured on a lateral or horizontal extension of push rod 63 and may be biased by a suitable spring (not shown) so as to normally form a continuation of the horizontal extension of push rod 63. Cam-shaped lever 64, by virtue of a suitable stop portion on rod 63, cannot move clockwise to a position below the horizontal. Therefore, as push rod 63 is moved upwardly due to energization of electromagnet coil 19, the flat surface of the cam-shaped lever 64 will push upwardly against one of the switch operating sliders 13, 14, etc., and, in this manner, partially rotate the frame 12 by a fraction ($^1/_{48}$) of a revolution, that is, to the next position corresponding to a 15-minute time interval, for example. At this position of the frame 12, one of the switches 43 to 47, inclusive, will be momentarily closed, depending upon which slider is moved to the lowermost position. Again, 15 minutes later, as the result of closing of the electric clock contacts, such as illustrated in Figure 1, coil 19 will again be momentarily energized and will cause the straight surface portion of lever 64 to abut against the next switch operating slider so as to again move the frame through another fraction of a revolution to the next position. In other words, each time after coil 19 becomes deenergized, a return spring associated therewith (not shown) or perhaps even the force of gravity alone is sufficient to cause downward movement and the slipping of the cam surface of lever 64 over the adjacent slider into a position beneath such slider so as to be ready for the next movement of the frame 15 when electromagnet coil 19 is again energized to cause further partial rotation of device 12. In this manner, there is intermittent movement of the frame 12 in a step-by-step manner at equal time intervals as controlled by the switch members on the electric clock, and at such time intervals an appropriate radio station is selected depending upon which slider is lowermost, that is, is in the operating position and has its cam portion in engagement with one of the switches 43 to 47, inclusive. In this manner, the tuning device automatically operates over a long period of time; for example, over a 24-hour period without attention. Thus, the switches 42–47, inclusive, and their associated circuits and elements and the timing mechanism comprising clock 18 and its operating electromagnet 19 movable to engage the sliders in succession, comprise means responsive to the positions of said members or sliders 13, 14, 15, etc., for determining the desired function-time intervals of the apparatus, specifically, for selecting the desired frequency-determining element or tuning coil during each interval.

At the end of the 24-hour period, the tuning device may be reset in preparation for the next 24-hour program preselection by depressing a reset pushbutton 70 protruding exteriorly of the casing, as shown in Figure 9, which will close a switch contained in switch casing 71 to effect completion of an energizing circuit for an armature coil 72 causing longitudinal movement of the armature together with plunger 73 rigidly secured thereto. A face plate 74, rigidly secured to plunger 73, will upon energization of coil 72, move against the ends of the switch operating sliders, one by one, so as to reset them to a normal inactive position as shown in Figure 3. Upon deenergization of relay coil 72, a return spring 75 will return the face plate 74 and plunger 73 to the position illustrated in Figure 5, arrested by stop 77, that is, to a retracted position. Face plate 74 may have an area sufficiently large to engage only one slider as illustrated, or, if desired, the area may be sufficiently extended so as to engage all of the sliders simultaneously if it is desired to avoid necessity of partially rotating the frame 12 through a fraction of a revolution and reset each slider individually as is necessary in the structure illustrated.

While the above described automatic operating device has been illustrated in connection with a radio receiver, it will be apparent to those skilled in the art that such automatic device is useful for other similar apparatus such as, for example, radio transmitters, automatic record changing and reproducing apparatus, and, in fact, any device where it is desired to preselect a predetermined sequence of events to occur at regular time intervals over a long period of time.

While I have shown a particular embodiment of my invention it will, of course, be understood that I do not wish to be limited thereto since many modifications and alternative constructions may be made without departing from the spirit and scope of my invention. I, of course, contemplate by the appended claims to cover any such modification to fall within the true spirit and scope thereof.

I claim as my invention:

1. An automatic tuning device for radio apparatus comprising a squirrel cage rotatable operating device having longitudinally movable switch operating elements disposed peripherally and longitudinally thereof, each of said elements having a radially extending finger, a plurality of stationary switches disposed longitudinally and adjacent said device for sequential operation by said fingers in a manner depending upon the longitudinal adjustments of said elements and upon the rotary position of said device for sequentially tuning said radio apparatus to different stations, and means including a timer for developing timed impulses to give step-by-step rotary movement to said operating device so as to sequentially and automatically tune-in said preselected sequence of radio stations over a period of time.

2. An automatic tuning device for radio apparatus comprising a squirrel cage rotatable operating device having longitudinally movable switch operating elements disposed peripherally and longitudinally thereof, a plurality of stationary switches disposed longitudinally and adjacent said device for sequential operation in a manner depending upon the longitudinal adjustments of said elements and upon the rotary position of said device for sequentially tuning said radio apparatus to different stations, and rotatable means including a plurality of plungers of different lengths which, initially, are sequentially moved into position and pushed against said switch operating elements so as to adjust them to the desired longitudinal position corresponding to particular radio stations desired.

3. An automatic tuning device for radio apparatus comprising a squirrel cage rotatable operating device having a plurality of peripherally disposed tuning elements adjustably positioned in a longitudinal direction, rotatable means eccentrically disposed with respect to said operating device and having a plurality of longitudinally movable spring biased plungers of different lengths any of which may be selectively moved into place by partial rotation of said rotatable means in order to so longitudinally adjust said tuning elements individually to preselect a plurality of different radio stations, and operating means controlled by an electric clock for generating impulses at equal time intervals to cause step-by-step partial rotation of said squirrel cage operating device to cause sequential automatic playing of said preselected radio stations over a long period of time.

4. An automatic tuning device for radio apparatus comprising a squirrel cage rotatable operating device having a plurality of peripherally disposed tuning elements adjustably positioned in a longitudinal direction, rotatable means eccentrically disposed with respect to said operating device and having a plurality of longitudinally movable, spring biased plungers of different lengths any of which may be selectively moved into place by partial rotation of said rotatable means in order to so longitudinally adjust said tuning elements individually to preselect a plurality of different radio stations, and plunger means for longitudinally moving said tuning elements to the "reset" position to keep said radio apparatus silent.

5. An automatic tuning device for radio apparatus comprising a casing, a squirrel cage switch operating device rotatably mounted therein and having a plurality of longitudinally adjustable switch operating bars peripherally disposed therearound, a calibrated preselector dial coupled to said device and having a portion extending out of said casing for manual rotation, a plurality of longitudinally disposed switches selectively operated in a manner depending on the successive positions of said operating bars as said operating device is rotated for selectively tuning said radio apparatus to different radio stations, and operating means including an electric timer for generating electrical impulses at equal time intervals and including an electromagnetically operated reciprocable, one-way acting pawl for imparting step-by-step partial rotation of said squirrel cage switch operating device to effect automatic playing of said preselected radio stations over a long period of time.

6. A program apparatus for setting up a predetermined schedule of a plurality of functions within a given time period comprising, a group of settable members, means for movably supporting said members, a group of member-setting devices, one of said groups corresponding in number to the number of time intervals in said time period and the other group corresponding in number to the number of functions, means for establishing an operative connection between each of said devices and any of said members to set the same, each of said devices having a different characteristic movement for moving an operatively connected member a different amount, and means responsive to the position of said members for determining the desired function-time interval.

7. A program apparatus for setting up a predetermined schedule of a plurality of functions within a given time period comprising, a group of settable sliders, means for movably supporting said sliders, a group of slider-setting devices, one of said groups corresponding in number to the number of time intervals in said time period and the other group corresponding in number to the number of functions, means for establishing an operative connection between each of said devices and any of said sliders to set the same, each of said devices having a different characteristic movement for moving an operatively connected slider a different amount, and means responsive to the position of said sliders for determining the desired function-time intervals.

8. A program apparatus for setting up a predetermined schedule of a plurality of functions within a given time period comprising, a group of elongated settable sliders, means for supporting said sliders for longitudinal movement thereof, a group of slider-setting devices, one of said groups corresponding in number to the number of time intervals in said time period and the other group corresponding in number to the number of functions, means for establishing an operative connection between each of said devices and any of said sliders to set the same, each of said devices having a different characteristic movement for moving an operatively connected slider a different amount, and means responsive to the positions of said sliders for determining the desired function-time interval.

9. A program apparatus for setting up a predetermined schedule of a plurality of functions within a given time period comprising, a group of settable sliders, means for movably supporting said sliders, a group of manually operable slider-setting devices, one of said groups corresponding in number to the number of time intervals in said time period and the other group corresponding in number to the number of functions, means for supporting said devices for movement to set a slider in registry therewith, means for normally biasing said devices out of engagement with said sliders, said two supporting means being relatively movable to bring each device into registry with any of said sliders to set the same, each of said devices having a different characteristic movement for moving a registering slider a different amount, and means responsive to the positions of said sliders for determining the desired function-time interval.

10. A program apparatus for setting up a predetermined schedule of a plurality of functions within a given time period comprising, a group of settable sliders, means for movably supporting said sliders, a group of reciprocable push-buttons each including a portion disposed to engage a slider in registry therewith, one of said groups corresponding in number to the number of time intervals in said time period and the other group corresponding in number to the number of functions, means for establishing an operative connection between each of said push-buttons with any of said sliders to set the same, each of said push-buttons having a different characteristic movement for moving an operatively connected slider a different amount, and means responsive to the positions of said sliders for determining the desired function-time interval.

11. A program apparatus for setting up a predetermined schedule of a plurality of functions within a given time period comprising, a group of settable sliders, means for movably supporting said sliders, a group of slider-setting devices, one of said groups corresponding in number to the number of time intervals in said time period and the other group corresponding in number to the number of functions, means for establishing an operative connection between each of said devices and any of said sliders to set the same, each of said devices being movable a different distance for moving an operatively connected slider a different amount, and means responsive to the position of said sliders for determining the desired function-time intervals.

12. A program apparatus for setting up a predetermined schedule of a plurality of functions within a given time period comprising, a group of settable sliders, means for movably supporting said sliders, a group of slider-setting devices, one of said groups corresponding in number to the number of time intervals in said time period and the other group corresponding in number to the number of functions, means for establishing an operative connection between each of said devices and any of said sliders to set the same, stop means cooperating with each of said devices for limiting the movements thereof to different amounts, thereby to move an operatively connected slider a different amount, and means responsive to the position of said sliders for determining the desired function-time intervals.

13. A program apparatus for setting up a predetermined schedule of a plurality of functions within a given time period comprising, a group of settable timing sliders, means for movably supporting said sliders, a group of function-slider-setting devices, means for establishing an operative connection between each of said devices and any of said sliders to set the same, each of said devices having a different characteristic movement for moving an operatively connected slider a different amount, and means responsive to the positions of said sliders for determining the desired function-time intervals.

14. A program apparatus for setting up a predetermined schedule of a plurality of functions within a given time period comprising, a group of settable timing sliders, means for movably supporting said sliders, a group of function slider-setting devices, means for establishing an operative connection between each of said devices and any of said sliders to set the same, each of said devices having a different characteristic movement for moving an operatively connected slider a different amount, and timing mechanism movable to engage said sliders in succession and responsive to the respective positions thereof for determining the desired function-time intervals.

15. A program apparatus for setting up a radio receiver including a plurality of selectable frequency-determining elements to receive any of a plurality of frequencies within a given time period comprising, a group of settable members, means for movably supporting said members, a group of member-setting devices, one of said groups corresponding in number to the number of time intervals in said time period and the other group corresponding in number to the number of frequencies, means for establishing an operative connection between each of said devices and any of said members to set the same, each of said devices having a different characteristic movement for moving an operatively connected member a different amount, and means responsive to the position of said members for selecting the desired frequency-determining element during each interval of said period.

16. A program apparatus for setting up a predetermined schedule of a plurality of functions within a given time period comprising, a group of settable members, means for movably supporting said members, a group of member-setting devices, one of said groups corresponding in number to the number of time intervals in said time period and the other group corresponding in number to the number of functions, means for periodically advancing said group of settable members step-by-step and manually operable means for moving said group of devices to establish an operative connection between each of said devices and any of said members to set the same, each of said devices having a different characteristic movement for moving an operatively connected member a different amount, and means responsive to the position of said members for determining the desired function-time interval.

17. A program apparatus for setting up a predetermined schedule of a plurality of functions within a given time period comprising, a group of settable sliders, a group of slider-setting devices, one of said groups corresponding in number to the number of time intervals in said time period and the other group corresponding in number to the number of functions, a pair of eccentric rotatable supporting frames, each having one of said groups movably mounted therein so as to bring each device into registry with any of said sliders to set the same, each of said devices having a different characteristic movement for moving a registering slider a different amount, and means responsive to the position of said sliders for determining the desired function-time intervals.

18. A program apparatus for setting up a predetermined schedule of a plurality of functions within a given time period comprising, a group of elongated settable sliders, a first frame including opposed end plates supporting said sliders for longitudinal movement thereof, said sliders being disposed substantially in a cylindrical array, a group of slider-setting devices, one of said groups corresponding in number to the number of time intervals in said time period and the other group corresponding in number to the number of functions, a second frame eccentric with said first frame and supporting said devices for movement to set a slider in registry therewith, said two supporting frames being rotatable to bring each device into registry with any of said sliders to set the same, each of said devices having a different characteristic movement for moving a registering slider a different amount, and means responsive to the position of said sliders for determining the desired function-time intervals.

JOHN A. ROHRER.

REFERENCES CITED

The following references are of record in the file of this patent:

UNITED STATES PATENTS

| Number | Name | Date |
| --- | --- | --- |
| 2,008,108 | Peterson | July 16, 1935 |
| 2,024,833 | Pasciutti | Dec. 17, 1935 |
| 2,047,853 | Carlson | July 14, 1936 |
| 2,066,246 | Bolton | Dec. 29, 1936 |
| 2,096,072 | Spagnola | Oct. 19, 1937 |
| 2,122,779 | Peters | July 5, 1938 |
| 2,248,116 | Peters | July 8, 1941 |
| 2,389,990 | Magnusson | Nov. 27, 1945 |
| 2,410,724 | Elliot | Nov. 5, 1946 |